US011418682B2

(12) United States Patent
Morovic et al.

(10) Patent No.: US 11,418,682 B2
(45) Date of Patent: Aug. 16, 2022

(54) GENERATING AN AREA COVERAGE VECTOR

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB); Victor Diego Gutierrez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/763,763

(22) PCT Filed: Dec. 14, 2017

(86) PCT No.: PCT/US2017/066403
§ 371 (c)(1),
(2) Date: May 13, 2020

(87) PCT Pub. No.: WO2019/117919
PCT Pub. Date: Jun. 20, 2019

(65) Prior Publication Data
US 2021/0176378 A1    Jun. 10, 2021

(51) Int. Cl.
*H04N 1/60* (2006.01)
*H04N 1/52* (2006.01)

(52) U.S. Cl.
CPC ......... *H04N 1/6019* (2013.01); *H04N 1/52* (2013.01); *H04N 1/6041* (2013.01); *H04N 1/6069* (2013.01)

(58) Field of Classification Search
None
See application file for complete search history.

(56) References Cited

U.S. PATENT DOCUMENTS 8,335,015 B2  12/2012  Klassen et al.
9,704,073 B2   7/2017  Okumura
(Continued)

FOREIGN PATENT DOCUMENTS

EP    2899964 A2    7/2015

OTHER PUBLICATIONS

Morovic et al., Direct Pattern Control Halftoning of Neugebauer Primaries, IEEE Transactions on Image Processing, vol. 26, No. 9, Sep. 2017 (Year: 2017).*

(Continued)

*Primary Examiner* — Barbara D Reinier
(74) *Attorney, Agent, or Firm* — HP Inc. Patent Department (57) ABSTRACT

Certain examples described herein relate to generating a Neugebauer Primary area coverage (NPac) vector. In certain cases, an operating state of a printing system is determined. A first NPac vector is obtained, having an initial set of Neugebauer Primaries (NPs). The initial set of NPs comprise a NP that is not implementable with the operating state. A target set of NPs is determined on the basis of the operating state, the target set of NPs being implementable with the operating state. A second NPac vector is generated, the second NPac vector having the target set of NPs.

18 Claims, 4 Drawing Sheets

(56) References Cited

U.S. PATENT DOCUMENTS

| | | | |
|---|---|---|---|
| 2007/0058181 A1* | 3/2007 | Hatori | H04N 1/6052 |
| | | | 358/1.9 |
| 2010/0085586 A1 | 4/2010 | Tin | |
| 2010/0214576 A1* | 8/2010 | Morovic | H04N 1/6016 |
| | | | 358/1.9 |
| 2011/0096345 A1 | 4/2011 | Benedicto | |
| 2011/0096364 A1 | 4/2011 | Morovic | |
| 2021/0053361 A1* | 2/2021 | Saez Gomez | B41J 29/393 |

OTHER PUBLICATIONS

Chen, Y.; "A Multi-ink Color-separation Algorithm Maximizing Color Constancy"; Oct. 4, 2003, http://www.art-si.org/PDFs/Printing/CIC03_Chen.pdf.

Yongda, C.; "Six Color Printer Characterization Using an Optimized Cellular Yule-nielsen Spectral Neugebauer Model"; Nov. 2004; Journal of Imaging Science and Technology.

* cited by examiner

GENERATING AN AREA COVERAGE VECTOR

BACKGROUND

A printing system may be associated with a color space, defined by colorants available to the printing system for deposition or application to a print medium. An example of a colorant color space is the Cyan, Magenta, Yellow, Black (CMYK) color space, wherein four variables are used in a subtractive color model to represent respective quantities of colorants. Examples of colorants include inks, dyes, pigments, paints, toners and powders.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Color can be represented within print and display devices in a large variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables ('X', 'Y' and 'Z' or 'tristimulus values') are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. An NPac vector in the NPac color space represents a statistical distribution of Neugebauer Primaries (NPs) over an area of a halftone. In a binary (bi-level, i.e. two drop states: "drop" or "no drop") printing system, an NP may be one of $2^k-1$ combinations of k printing fluids within the printing system, or an absence of printing fluid (resulting in $2^k$ NPs in total). A colorant or printing fluid combination as described herein may be formed of one or multiple colorants or printing fluids. For example, if a bi-level printing device uses CMY printing fluids there can be eight NPs. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). A multi-level printer may use a piezo-electric or thermal print head that is capable of depositing different numbers of drops or different drop volumes, and/or may use multiple passes of a print head, to enact different drop states. For example, if a multi-level printer uses CMY printing fluids with four different drop states ("no drop", "one drop", "two drops" or "three drops"), available NPs can include C, CM, CMM, CMMM, etc. A "drop sequence" as used herein may define a set of drop states used or useable by a given printing system in a given operating state.

An NPac color space may provide a large number of metamers, e.g. due to the relatively high dimensionality of the color space as compared to color spaces with three or four dimensions. Metamerism is the existence of a multitude of combinations of reflectance and emission properties that result in the same perceived color for a fixed illuminant and observer. Colors that are perceived as the same color in this way may be called 'metamers'.

Each NPac vector may therefore define a probability distribution for colorant or printing fluid combinations for each pixel in the halftone (e.g. a likelihood that a particular colorant or printing fluid combination is to be placed at each pixel location in the halftone). In this manner, a given NPac vector defines a set of halftone parameters that can be used in the halftoning process to map a color to NPac vectors to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. This may result in discrete deposit instructions for print resolution pixels, e.g. instructing 0 to N drops of each of the k printing fluids on an addressable area of a print medium. Over a plurality of addressable areas, e.g. an area of print substrate, having a color defined by an NPac vector, the distribution of the printed output will tend towards the statistical distribution of area coverage defined by the NPac vector. An example of a printing system that uses area coverage representations for halftone generation is a Halftone Area Neugebauer Separation (HANS) pipeline.

Certain examples described herein relate to modifying or converting a color lookup table. The color lookup table may comprise a data structure stored in memory that is used by a printing system. The color lookup table may map between color spaces, storing such mappings as entries in the color lookup table. For example, the color lookup table may map colorimetric values in a color space with vectors in area coverage space. The color lookup table may output values of vectors in area coverage space, e.g. NPac vectors in the NPac color space. The input to the color lookup table may be values in a tristimulus color space, or may be values of area coverage vectors. Modifying a color lookup table may involve generating NPac vectors to replace original NPac vectors in the color lookup table. A color lookup table, e.g. a HANS lookup table, may have a characteristic set of NPs which are used by the NPac vectors in the lookup table. The number and nature of NPs used in the lookup table may determine the printability and properties of colors processed using the HANS lookup table.

A color lookup table may be generated by defining mappings between particular locations in two respective color spaces, and storing the mappings as entries, or "nodes", in a data structure, i.e. the color lookup table. Intermediate nodes in the color lookup table (e.g. entries in the color lookup table corresponding to respective locations in a color space that are between particular locations in the color space that have a defined mapping) may be interpolated based on surrounding nodes that are associated with a defined mapping. For example, a regular sampling (e.g. of $17^3$ or $9^4$ entries) may be taken from the color lookup table and interpolated using an interpolation sequence, e.g. ranging from a simple Delaunay tessellation to more advanced methods. Such interpolation methods may vary in which surrounding nodes are used to interpolate a given new node, however many use a form of convex combination or barycentric coordinate computation.

Figure 1:
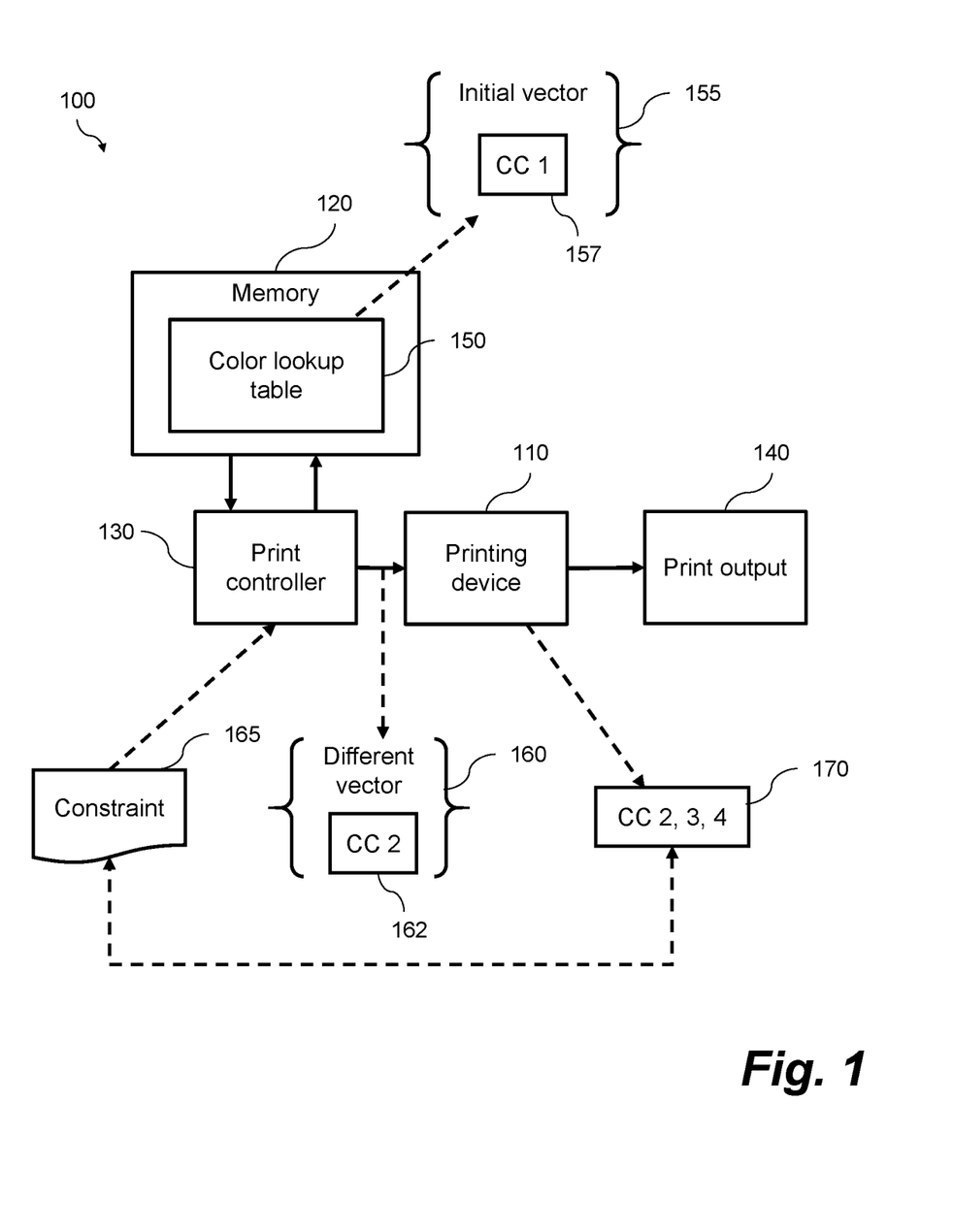
FIG. 1 is a schematic diagram of a printing system according to an example.

FIG. 1 shows a printing system 100 according to an example. Certain examples described herein may be implemented within the context of this printing system.

The printing system 100 may be a 2D printing system such as an inkjet or digital offset printer, or a 3D printing system. In the example of FIG. 1, the printing system 100 comprises a printing device 110, a memory 120, and a print controller 130. The print controller 130 may be implemented using machine readable instructions and suitably programmed or configured hardware, e.g. circuitry.

The printing device 100 is arranged to apply a print material to a print target in a printing process, for example to produce a print output 140. The print output 140 may, for example, comprise colored printing fluids deposited on a substrate. The printing device 110 may comprise an inkjet deposit mechanism, which may e.g. comprise a nozzle to deposit printing fluid on the substrate. The inkjet deposit mechanism may include circuitry to receive instructions associated with depositing printing fluid. In 2D printing systems, the substrate may be paper, fabric, plastic or any other suitable print medium.

In 3D printing systems, the print output 140 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. The fusing agent and detailing agent may control a temperature of a bed of build material. The fusing agent may comprise an energy-absorbing chemical compound that acts to increase a temperature of a portion of build material. The detailing agent may comprise a cooling agent, such as a water-based liquid, that acts to reduce a temperature of a portion of build material. In this manner, a fusing agent may be selectively applied to a layer in areas where particles of the build material are to fuse together, and a detailing agent may be selectively applied where the fusing action is to be reduced. In some examples, the printing agents may comprise colorants and may be deposited on a white or blank powder to color the powder. In other examples, objects may be constructed from layers of fused colored powder.

The memory 120 stores a color lookup table 150 to map between color spaces. The color lookup table 150 may map colorimetric values to vectors in an area coverage space. For example, the color lookup table 150 may map RGB or CMYK color values to NPac vectors. In some examples, the color lookup table 150 maps XYZ, Lab or any other color space used to specify the device color space. Where the vectors comprise NPac vectors, the color lookup table 150 may be referred to as a "HANS lookup table". When an RGB mapping is used, the HANS lookup table may comprise $17^3$ entries. When a CMYK mapping is used, the HANS lookup table may comprise $9^4$ entries.

The color lookup table 150 comprises an initial vector 155 in area coverage space. The initial vector 155 may have a defined number of elements or entries where each element takes a value within a predefined range. For example, where the initial vector 155 is an NPac vector, each value may be between 0 and 1 and the sum of all the values in the vector is 1. The initial vector 155 may have a predefined structure or form defining the number and/or type of elements in the vector. The initial vector 155 may correspond to an entry in the color lookup table 150, where the vector 155 is retrieved as an output of a lookup operation, e.g. given an input vector in a color space such as a tristimulus color space. The initial vector 155 defines a statistical distribution of a first set of colorant combinations over an area of a halftone. The first set of colorant combinations may be a set of colorant combinations used by each vector in the color lookup table 150. For example, each vector in the color lookup table 150 may define a statistical distribution of the first set of colorant combinations over an area of a halftone. As such, the first set of colorant combinations may be a characteristic or global set of colorant combinations for the color lookup table 150. In examples, the initial vector 155 comprises an NPac vector. As described, the color lookup table 150 may comprise a HANS lookup table, and the initial vector 155 may therefore comprise an NPac vector corresponding to an entry in the HANS lookup table.

A colorant may be otherwise referred to as a "printing fluid". A colorant may correspond to a given base color, where other colors may be formed from combinations of colorants. Examples of base colors include, but are not limited to, cyan, magenta, yellow, red, green and blue and black. The number of colorants in a given set of colorants may be less than the number of possible colorant combinations, e.g. NPs, based on the given set of colorants.

The initial vector 155 may define, for each colorant combination in the first set of colorant combinations, a likelihood that the colorant combination is to be placed at a given location in an image, e.g. a given output pixel location in a halftone. An output pixel may be a print resolution pixel, i.e. an addressable (printable) area on a print substrate. The initial vector 155 may have a plurality of components, each component corresponding to a colorant combination in the first set of colorant combinations. A given component of the initial vector 155 may have a value representing a probability that a colorant combination corresponding to the given component is to be placed at the given location in the image. In examples where the initial vector 155 is an NPac vector, the first set of colorant combinations may correspond to a first set of NPs.

The initial vector 155 uses a colorant combination 157 that is not implementable with an operating state of the printing process. The colorant combination 157 that is not implementable with the operating state may be one of the first set of colorant combinations.

The operating state of the printing process may be otherwise referred to as an "operating characteristic", "configuration state", "operating constraint", "operating capability" or the like. An operating state may be a configuration of the printing system 100 that influences how the printing process is performed by the printing system 100. In some examples, the operating state relates to a current set of colorant combinations used by the printing process. In examples, the operating state relates to a constraint 165 of the printing process and/or of the printing system 100 implementing the printing process. For example, different printing systems may have different operating characteristics, relating to the constraints or capabilities of the different printing systems. In some examples, a given printing system may be configurable with different operating states, for example where a given operating state is associated with a given printing process of a plurality of printing processes performable by the printing system. A constraint 165 may relate to the use of NPs over the color lookup table 150.

In some examples, the operating state relates to a colorant drop sequence of the printing process. A colorant drop sequence may define a set of possible drop states of colorants used in the printing process. For example, a first colorant drop sequence may allow for the drop states [0, 1, 2, 4] to be used, where each drop state refers to a number of drops (or volume) of printing fluid to be deposited. As discussed previously, this may relate to numbers of drops ejected by a print head and/or a number of passes of a print head. In this colorant drop sequence, a 4-drop state is used but a 3-drop state is not used. A second, different colorant drop sequence may allow for the drop states [0, 1, 2, 3] to be used. In the second colorant drop sequence, a 3-drop state is used but a 4-drop state is not used. Some example printing systems may be configured to transition from one colorant drop sequence to a different colorant drop sequence. Different NPs may be implementable with different colorant drop sequences. For example, NPs using a 4-drop state may not be implementable with a [0, 1, 2, 3] drop sequence.

In some examples, the operating state relates to a number of passes used in the printing process. The printing system may use a multi-pass printing process. The number of passes may be constrained by the printing system 100. The colorant drop sequence may be dependent on the number of passes, or vice-versa. A change in the colorant drop sequence may be influenced by the number of passes and/or by a change in the number of passes, for example. Different numbers of passes may be associated with different print modes. For example, a first print mode may use eight passes and a second print mode may use four passes. It may be desirable for the number of passes to exceed the highest drop state defined by the colorant drop sequence. For example, when using a colorant drop sequence having a 4-drop state as the highest drop state, it may be desirable to use more than four passes in the printing process. Similarly, when using a 4-pass printing mode, it may be desirable for the highest drop state in the colorant drop sequence to be less than 4. For example, an initial colorant drop sequence using 4-drop states, e.g. [0, 1, 2, 4], may be changed to a colorant drop sequence having a highest drop state of 3, e.g. [0, 1, 2, 3], on the basis of the number of passes of the printing process. Using a colorant drop sequence having a highest drop state that is lower than the number of passes may enable a masking operation to be performed on one of the passes. Performing a masking operation may increase a level of visual quality in the print output, e.g. in terms of grain, compared to a case in which no such masking operation is performed. A masking operation may be used to distribute deposited drops of colorant. If a colorant drop sequence having a 4-drop number state is used with a four pass printing operation, no passes may be available for the masking operation. However, if the colorant drop sequence were changed to one in which the highest available drop state is a 3-drop number state, rather than a 4-drop number state, one of the four passes may instead be used for the masking operation, thereby enabling an increase in visual quality.

In some examples, the operating state relates to a total number of colorant combinations that the printing system 100 is configured to handle, for example in a printing pipeline used by the printing system 100. The total number of colorant combinations that the printing system 100 can handle may be considered a constraint or limitation of the printing system 100 and/or of the printing pipeline used by the printing system 100. For example, a memory and/or system bus bandwidth in an embedded control system may use a given number of bits, which may constrain the number of elements in a colorant combination vector (e.g. an 8-bit constraint may limit the number of colorant combinations to 255).

The print controller 130 is arranged to determine a parameter of the operating state. In examples where the operating state relates to a colorant drop sequence, the parameter of the operating state may indicate, for example, the number and/or nature of drop states in the colorant drop sequence used in the printing process. In some examples, the parameter is indicative of a change from one operating state to another operating state. For example, the parameter may indicate how the colorant drop sequence used in the printing process is different from another colorant drop sequence. In examples where the operating state relates to a total number of colorant combinations that the printing system 100 is configured to handle, the parameter of the operating state may indicate said total number, for example. Alternatively, the parameter may indicate how the total number changes as one operating state transitions to another operating state. For example, the parameter may indicate the size of a reduction in the number of colorant combinations that are able to be handled.

The print controller 130 is arranged to derive, using the parameter, a second set 170 of colorant combinations. The second set 170 of colorant combinations is different from the first set of colorant combinations used by the initial vector 155 in the color lookup table 150. In some cases, the first set of colorant combinations and the second set 170 of colorant combinations comprise different numbers of colorant combinations. In some examples, the second set 170 of colorant combinations comprises a subset of the first set of colorant combinations. In some examples, the second set 170 of colorant combinations uses colorant combinations that are not in the first set of colorant combinations. The first set of colorant combinations and the second set 170 of colorant combinations may have one or more colorant combinations in common, that is, the first set and the second set may overlap. The second set 170 of colorant combinations are implementable with the operating state. The second set 170 of colorant combinations includes colorant combination 162 that is implementable with the operating state. The colorant combination 162 that is implementable with the operating state is different from the colorant combination 157 that is not implementable with the operating state. The second set 170 of colorant combinations may be a set of colorant combinations that are available for use in the printing process when the printing process has the determined operating state.

In some examples, the number of colorant combinations in the second set 170 of colorant combinations is constrained by the operating state of the printing process. For example, the operating state and/or the parameter of the operating state may be used to determine the number of colorant combinations in the second set 170 of colorant combinations.

In examples, the operating state defines the second set 170 of colorant combinations. In examples where the operating state relates to a colorant drop sequence, the second set 170 of colorant combinations may comprise a full set of colorant combinations (e.g. every available colorant combination) for the given drop sequence. For example, if the printing system 100 uses six colorants with a colorant drop sequence of [0, 1, 2, 4], a full set of colorant combinations comprises $6^4-1$ colorant combinations, plus whitespace or "blank". If the total number of colorant combinations that the printing system is configured to handle is unconstrained, the full set of colorant combinations for the colorant drop sequence may be used as the second set 170 of colorant combinations.

In some examples, for example if the total number of colorant combinations is constrained, the full set of colorant combinations for the drop sequence may be considered an intermediate set of colorant combinations. In an example, the second set 170 of colorant combinations is derived by replacing a first colorant combination in the intermediate set of colorant combinations with a second colorant combination. The first colorant combination and the second colorant combination may use different drop states. The first colorant combination may be replaced with the second colorant combination on the basis of the first set of colorant combinations. For example, if there is a change in the drop sequence from [0, 1, 2, 3] to [0, 1, 2, 4], namely an upward change, colorant combinations that use a 4-drop state may be replaced with colorant combinations that use a 3-drop state in the second set of colorant combinations. In another example, if there is a downward change in the drop sequence, e.g. from [0, 1, 2, 4] to [0, 1, 2, 3], additional colorant combinations may be used in the second set of colorant combinations. The additional colorant combinations may comprise combinations of 3-drop and 2-drop states not present in the first set of colorant combinations.

The second set 170 of colorant combinations may be derived based at least in part on the first set of colorant combinations.

In some examples, deriving the second set 170 of colorant combinations involves analyzing the color lookup table 150 to determine an extent to which different colorant combinations in the first set of colorant combinations are used in the color lookup table 150. A value of a lookup table use parameter may be determined for each colorant combination in the first set of colorant combinations. The values of the lookup table use parameter may be defined by the vectors in the color lookup table 150. For a given colorant combination in the first set of colorant combinations, the value of the lookup table use parameter may represent an extent to which the given colorant combination is used in the color lookup table 150. In some examples, the colorant combinations in the first set of colorant combinations are sorted based on their respective lookup table use parameter values. In other words, the colorant combinations in the first set may be sorted based on the extent to which each colorant combination is used throughout the color lookup table 150. That is, the colorant combinations in the first set may be sorted based on a measure of their relative importance in the color lookup table 150. The obtained values of the lookup table use parameter for the first set of colorant combinations may provide a frequency distribution representative of the occurrence or use of the first set of colorant combinations over the lookup table 150. In some examples, the value of the lookup table use parameter for a given colorant combination may correspond to the maximum area coverage of the given colorant in any vector in the color lookup table 150.

The second set 170 of colorant combinations may be derived by selecting colorant combinations from the first set of colorant combinations based on the values of the lookup table use parameter of the colorant combinations in the first set of colorant combinations. For example, the second set 170 of colorant combinations may comprise the most used colorant combinations from the first set of colorant combinations over the lookup table 150. In other words, a frequency distribution representing an extent to which each colorant combination in the first set of colorant combinations is used in the lookup table 150 may be clipped to obtain the second set 170 of colorant combinations. The number of colorant combinations in the second set 170 of colorant combinations may correspond to the total number of colorant combinations that the printing pipeline is configured to handle, e.g. 128 colorant combinations. In example, a transition may occur from an operating state in which a printing pipeline is able handle a first number of colorant combinations, e.g. corresponding to the number of colorant combinations in the first set of colorant combinations, to an operating state in which the printing pipeline is able to handle a second, different number of colorant combinations. The first set of colorant combinations may be truncated (or expanded) to derive the second set 170 of colorant combinations in response to such a transition.

In some cases, the second set 170 of colorant combinations may be derived by determining the minimum set of colorant combinations that can generate the space of vectors (e.g. NPac vectors) in the color lookup table 150 up to 100% area coverage. Such a minimum set of colorant combinations may comprise all the side-by-side colorant combinations at all possible drop states. Side-by-side printing may involve printing units of colorants next to one another rather than on top of one another as in overprinting. For example, a system using 12 colorants with a drop sequence of [0, 1, 2, 3] may have 36 single-colorant combinations plus whitespace (e.g. 37 single-colorant NPs, where the lookup table 150 is a HANS lookup table). Such a set may be used as the second set 170 of colorant combinations unless the lookup table 150 goes beyond 3 drops of colorant at a time, e.g. if the lookup table 150 uses 3 drops of one colorant overprinted with 3 drops of another colorant at more than 50% area coverage, resulting in an overall greater than 3 drop use.

In some examples, the minimum set comprising the single-colorant combinations obtained above may be expanded by adding additional colorant combinations to the minimum set. The additional colorant combinations may be multi-colorant combinations, e.g. overprint colorant combinations. The additional colorant combinations may be determined and/or selected based on a determined color (or lightness) difference between two side-by-side colorant combinations. For example, an optical difference may be determined between a first single-colorant combination comprising 1 drop of yellow colorant and a second single-colorant combination comprising 1 drop of grey colorant. Additional colorant combinations may be added that overprint such states, for example a colorant combination comprising 1 drop of yellow colorant and 1 drop of grey colorant. Multi-colorant combinations may be added to the minimum set of single-colorant combinations until the total number of colorant combinations the printing pipeline is configured to handle has been reached. The resulting set may be used as the second set 170 of colorant combinations.

Once the second set 170 of colorant combinations has been determined, the print controller 130 is arranged to update the initial vector 155 with a different vector 160 in the color lookup table 150 stored in the memory 120. The different vector 160 uses colorant combinations from the second set 170 of colorant combinations. For example, the print controller 130 may update the entry in the color lookup table 150 that maps to the initial vector 155 to instead map to the different vector 160. The color mapping represented by the color lookup table 150 may be applied to print job data, for example in a printing operation performed by the printing system 100. The different vector 160 may have a different definition or configuration than the initial vector 155, e.g. elements in the initial vector 155 may relate to colorant combinations in the first set of colorant combinations, including the colorant combination 157 that is not implementable with the operating state, and elements in the different vector 160 may relate to colorant combinations in the second set 170 of colorant combinations, which are implementable with the operating state. The initial vector 155 and the different vector 160 may have different numbers of elements, e.g. where each element corresponds to a colorant combination in a given set of colorant combinations. In examples, the initial vector 155 may be adjusted to correspond to the different vector 160. In other examples, the initial vector 155 may be replaced by the different vector 160, e.g. the initial vector 155 may be deleted from a memory location and the different vector 160 stored at the memory location.

In some examples, the print controller 130 generates the different vector 160. Generating the different vector 160 may involve defining a new vector configuration, e.g. based on the second set 170 of colorant combinations, and then computing mapped values for that new vector configuration, i.e. generating new element values. The different vector 160 may be generated based on a criterion of the print output. Examples of the criterion include increasing or decreasing overprinting and increasing or decreasing whitespace in the print output, as described in more detail below.

In an example, the second set 170 of colorant combinations are used by the printing device 110 to generate the print output 140.

Figure 2:
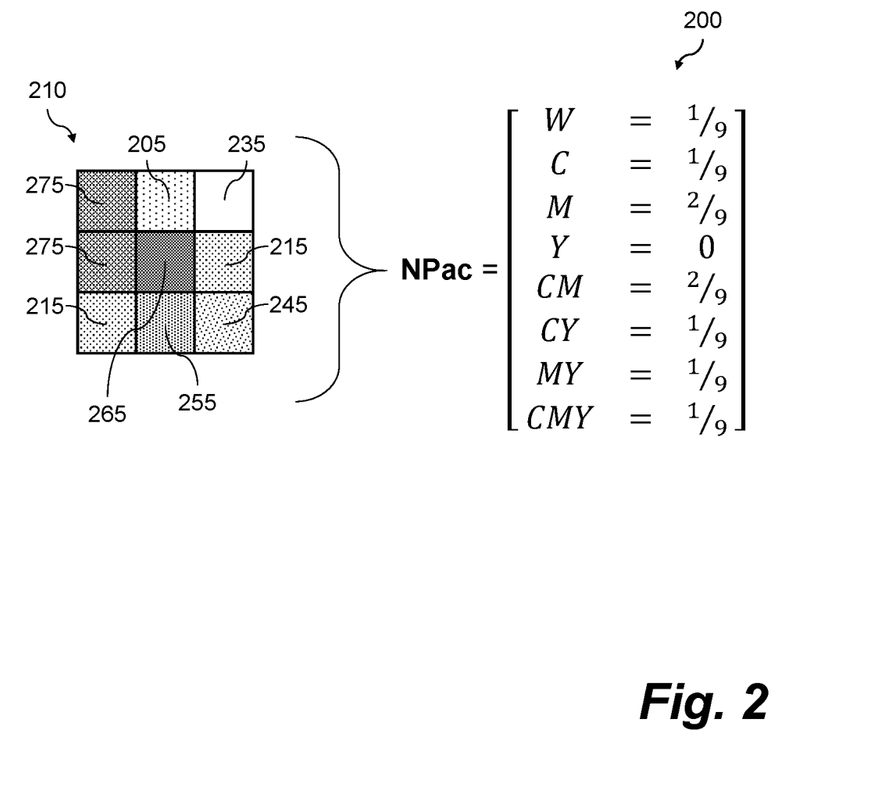
FIG. 2 is a schematic diagram showing a representation of a Neugebauer Primary area coverage vector according to an example.

FIG. 2 shows an example NPac vector 200 for use in a CMY imaging system. The NPac vector 200 may be a generated NPac vector resulting from a method performed in accordance with examples described herein. This example shows a three-by-three pixel area 210 of a print output where all pixels have the same NPac vector: vector 200. The NPac vector 200 defines the probability distributions for each NP for each pixel, for example a likelihood that $NP_x$ is to be placed at the pixel location. Hence, in the example print output there is one pixel of White (W) (235); one pixel of Cyan (C) (245); two pixels of Magenta (M) (215); no pixels of Yellow (Y); two pixels of Cyan+Magenta (CM) (275); one pixel of Cyan+Yellow (CY) (255); one pixel of Magenta+Yellow (MY) (205); and one pixel of Cyan+Magenta+Yellow (CMY) (265). Generally, the print output of a given area is generated such that the probability distributions set by the NPac vectors of each pixel are fulfilled. For example, the NPac vector may be effected by a halftone stage that implements the spatial distribution of colorants combinations defined by the vector, e.g. via a series of geometric shapes such as dots of predetermined sizes being arranged at predetermined angles. As such, an NPac vector is representative of the colorant overprint statistics of a given area. Although a CMY system is used for ease of explanation, other imaging systems may be used.

Figure 3:
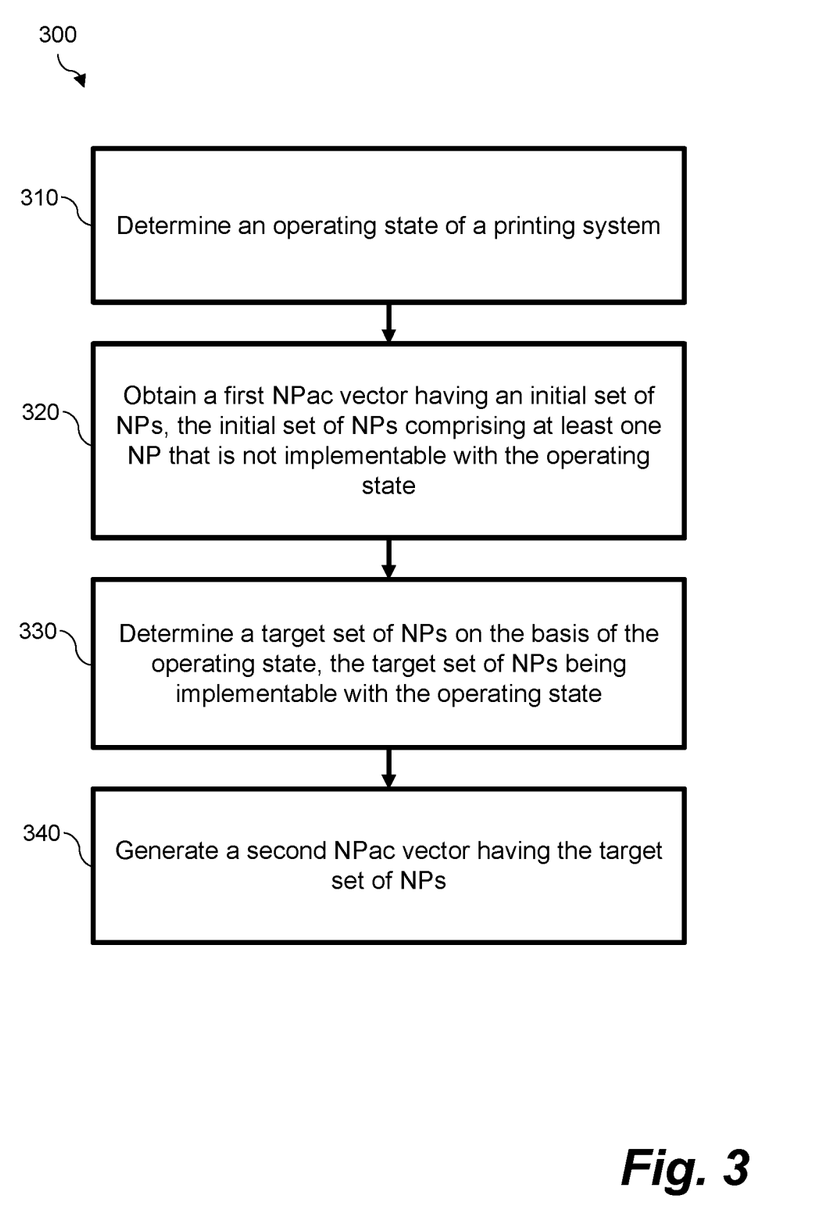
FIG. 3 is a flow chart illustrating a method of generating a Neugebauer Primary area coverage vector according to an example.

FIG. 3 shows a method 300 according to an example. In some examples, the method 300 is performed by a print controller such as the print controller 130 of FIG. 1. The print controller may perform the method based on instructions retrieved from a computer-readable storage medium. The method 300 may be performed in accordance with a printing system such as the printing system 100 of FIG. 1.

At item 310, an operating state of a printing system is determined. The operating state may relate to, for example a configuration or constraint with which the printing system is to operate.

In some examples, the operating state relates to a colorant drop sequence. The colorant drop sequence defines a set of drop states of colorants used by the printing system.

In some examples, the operating state relates to a total number of NPs that a printing pipeline used by the printing system is configured to handle.

At item 320, a first NPac vector is obtained. The first NPac vector may be part of a lookup table. The lookup table comprises NPac vectors having an initial set of NPs. As such, the first NPac vector has the initial set of NPs. That is, a first vector configuration is defined where the elements of the vector relate to respective NPs in the initial set of NPs, wherein each element may have a value for a given vector value. The initial set of NPs comprises at least one NP that is not implementable with the operating state. For example, the initial set of NPs may comprise an NP that is not available for use by the printing system having the determined operating state.

At item 330, a target set of NPs is determined on the basis of the operating state. The target set of NPs is implementable with the operating state. That is, each NP in the target set of NPs may be implementable with the operating state. In an example, the initial set of NPs and the target set of NPs comprise different numbers of NPs. For example, the target set of NPs may comprise fewer NPs than the initial set of NPs.

In some examples, for each NP in the initial set of NPs, an area coverage metric is determined. The area coverage metric is defined by the NPac vectors in an obtained lookup table, e.g. the initial NPac vectors. The area coverage metric for a given NP in the initial set of NPs indicates an extent to which the given NP is used in the obtained lookup table. In examples, the target set of NPs is determined based on the area coverage metrics for the initial set of NPs.

In some examples, for example when the operating state relates to a colorant drop sequence, an intermediate set of NPs is obtained. The intermediate set of NPs is implementable with the colorant drop sequence. For example, each of the intermediate set of NPs may be implementable with the colorant drop sequence. A first NP in the intermediate set of NPs may be replaced by a second NP on the basis of the initial set of NPs. The first NP and the second NP use different drop states in the colorant drop sequence. Determining the target set of NPs may involve replacing the first NP in the intermediate set of NPs with the second NP. That is, the second NP may be part of the target set of NPs and the first NP may not be part of the target set of NPs.

At item 340, a second NPac vector is generated. The second NPac vector has the target set of NPs. In some examples, an obtained lookup table is converted to use NPac vectors having the target set of NPs, e.g. as a data structure form for output of the lookup table, given a lower dimensionality (e.g. tristimulus) input vector to map from.

In some examples, the initial set of NPs is implementable with an initial operating state of the printing system. The initial operating state is different from operating state determined at item 310. In some examples, a change is detected from the initial operating state to the operating state determined at item 310. The target set of NPs may be determined, and the second NPac vector generated, in response to such a detected change of the operating state of the printing system.

In some examples, converting the lookup table comprises defining an NPac vector having the target set of NPs. For example, new output node values may be computed in the lookup table based on a vector definition that has the target set of NPs as elements. The second NPac vector, having the target set of NPs, may be generated based on a criterion of a print output of the printing system.

In examples, the criterion of the print output relates to overprinting in the print output. An overprint may comprise a unit (e.g. a drop) of one available colorant deposited on top of a unit of another available colorant in a common addressable print area (e.g. a print resolution pixel). For example, the NP CM may correspond to an overprint of one drop of magenta (M) on top of one drop of cyan (C). In some cases, the criterion may comprise increasing overprinting. In certain cases, the criterion comprises maximizing overprinting. Maximizing overprinting may correspond to increasing the amount of overprinting in the print output, e.g. increasing the proportional area of the print output that is overprinted, subject to constraints. Examples of such constraints are discussed further below. In these examples, the print controller 130 may use multi-colorant NPs from the target set of NPs. Additionally, or alternatively, the print controller 130 may give a larger area coverage value to components of the second NPac vector that correspond to overprint colorant combinations, relative to components of the second NPac vector that do not correspond to overprint colorant combinations.

In other cases, the criterion of the print output comprises decreasing overprinting, e.g. decreasing the proportional area of the print output that is overprinted, subject to constraints. In certain cases, the criterion comprises minimizing overprinting. This may correspond to increasing side-by-side printing of colorants. Side-by-side printing may involve printing units of colorants next to one another rather than on top of one another as in overprinting (e.g. depositing a drop each of C and M next to each other in an addressable print area as opposed to a drop of M on top of one drop of C). In these examples, the print controller 130 may use single-colorant NPs from the target set of NPs. Additionally, or alternatively, the print controller 130 may give a larger area coverage value to components of the second NPac vector that correspond to single-colorant NPs, relative to components of the second NPac vector that correspond to multi-colorant NPs.

In examples, the criterion may additionally or alternatively relate to whitespace in the print output generated by the printing process. For example, the criterion may comprise increasing or decreasing whitespace in the print output. "Whitespace" may be considered a portion of a print target or image, e.g. the print output, which does not have print material, e.g. a colorant, applied to it. Therefore, decreasing whitespace may corresponding to reducing the proportion of the print target that is left blank. In some cases the criterion comprises minimizing whitespace, for example decreasing the amount of whitespace as much as possible subject to constraints. As an illustrative example, to decrease whitespace when generating the second NPac vector having the target set of NPs, the print controller 130 may give a smaller area coverage to a component of the second NPac vector that corresponds to a blank (W) NP (i.e. indicating an absence of colorant), relative to other components of the second NPac vector that correspond to non-blank NPs.

In some examples, converting the lookup table comprises determining a colorant-use vector for a given NPac vector in the lookup table, e.g. a vector of a form $[C_u, M_u, Y_u, K_u]$, based on values for the elements of the given NPac vector. The given NPac vector uses the initial set of NPs. This may be repeated for all NPac vectors, i.e. output nodes, in the color lookup table. A colorant-use vector may comprise components corresponding to individual colorants, where values of the components correspond respectively to the amount of the corresponding colorant used relative to the other colorants represented in the colorant-use vector. Component values of a colorant-use vector may therefore be determined based on NPs and corresponding relative area coverages defined by the given NPac vector.

The second NPac vector may be generated on the basis of the colorant-use vector of the first NPac vector. The second NPac vector uses the target set of NPs. The first NPac vector may be replaced with the second NPac vector in the lookup table. In some examples, a colorant-use vector of the second NPac vector has a predetermined relationship with the colorant-use vector of the first NPac vector. For example, the colorant-use vector of the second NPac vector may be equal to the colorant-use vector of the first NPac vector. The second NPac vector may be generated such that the colorant-use vector of the second NPac vector, determinable based on the target set of NPs and corresponding area coverages defined by, i.e. used to generate, the second NPac vector, is equivalent to the colorant-use vector of the first NPac vector. Equivalent colorant-use vectors may comprise the same value per component, wherein the vector components correspond respectively to the amount of the corresponding colorant used relative to the other colorants represented in the colorant-use vector.

In examples, the method 300 may involve applying an imaging metric to the target set of NPs, the imaging metric corresponding to or being based on the criterion of the print output. A relation between NPs in the target set of NPs may be determined as part of the method 300. The relation may be used to determine area coverages of NPs in the target set of NPs to be used for generating NPac vectors, e.g. the second NPac vector, for converting the lookup table. For example, area coverages may be determined which optimize the relation. In some examples, a subset of the target set of NPs is selected for use in the second NPac vector. The subset of the target set of NPs may be selected using the imaging metric, e.g. based on the criterion of the print output.

Applying an imaging metric to the target set of NPs may comprise weighting NPs in the target set of NPs differently for input to the relation, with weightings dependent on the criterion. As an example, if the criterion comprises increase overprinting, and optimizing the relation comprises reducing an output of an objective function within constraints, the NPs in the target set of NPs (or a subset of the target set of NPs) may be weighted to penalize blank space and single-colorant NPs relative to multi-colorant NPs. In this way, optimizing the relation may favor NPs that are associated with the criterion, e.g. overprint or multi-colorant NPs if the criterion comprises increasing overprinting. The imaging metric applied to the target set of NPs may be hierarchical. For example, if the criterion comprises increasing overprinting, a blank NP may be penalized more than single-colorant NPs, which in turn may be penalized relative to overprint or multi-colorant NPs.

Area coverages corresponding to NPs, e.g. in an NPac vector, may comprise a value in a range of 0 to 1, or [0, 1], since the area coverages represent probabilities. If the criterion comprises increasing overprinting, applying the imaging metric to the target set of NPs may comprise giving the blank NP (e.g. W) a relative weight of 10000, for example. Single-colorant NPs may be given a relative weight of 100, and overprint or multi-colorant NPs may be given a relative weight of 1. These relative weightings may therefore produce a relation between NPs in the target set of NPs, e.g. an objective function, that penalizes whitespace most, followed by single-colorant NPs and has nominal values for multi-colorant NPs that accord with the criterion of increasing overprinting. In this example, an error from 0.1% of blank space may be 1, while an error of 1 would be achieved if a single multi-colorant NP were at 100% coverage. Hence, output values corresponding to blank NPs may weigh orders of magnitude more than those caused by NPs that are in accordance with the criterion.

In some examples, NPs in the target set of NPs may be weighted such that a difference or distance between the generated second NPac vector and an initial NPac vector (having the initial set of NPs) is reduced or optimized. Therefore NPac vectors may be generated which are similar to initial NPac vectors but which use a different set of NPs.

In some examples, the method 300 comprises generating the second NPac vector using the target set of NPs and corresponding area coverages determined to optimize the relation.

In examples, determining the relation between NPs in the target set of NPs is based on constraints. The constraints may include a second colorant-use vector, determinable based on the target set of NPs and corresponding area coverages used to generate, i.e. define, the second NPac vector, corresponding to, for example being equivalent to, a first colorant-use vector determined based on the initial set of NPs and corresponding area coverages defined by the initial NPac vector. In certain cases, the first colorant-use vector is determined as described above, and the corresponding area coverages of the target set of NPs selectable to generate the second NPac vector are those that would give a colorant-use vector equivalent to the first colorant-use vector. This constraint may correspond to an equality condition when optimizing the relation.

The constraints may include a predetermined minimum area coverage of each NP defined by, i.e. used to generate, the second NPac vector. For example, as area coverages in an NPac vector represent probabilities, a minimum area coverage value of zero may be set as a constraint. This may mean that negative area coverages are not allowed in the generated second NPac vector. In other examples, the predetermined minimum area coverage may be greater than zero. This may result in fewer NPs used to generate, and thus defined by, the second NPac vector, e.g. compared to the number of NPs associated with the initial NPac vector. This constraint may correspond to an inequality condition when optimizing the relation.

Similarly, the constraints may include a predetermined maximum area coverage of each NP defined by, i.e. used to generate, the second NPac vector. For example, as area coverages in an NPac vector represent probabilities, a maximum area coverage value of one may be set as a constraint. This may mean that any area coverage value, corresponding to an NP, in the generated second NPac vector may not exceed the print area addressable by the NPac vector. This constraint may correspond to an inequality condition when optimizing the relation.

The constraints may include a predetermined total area coverage of the NPs defined by, i.e. used to generate, the second NPac vector. For example, a sum of all area coverages in the generated second NPac vector equivalent to a maximum possible probability, e.g. 1, may be set as a constraint. This constraint may correspond to an equality condition when optimizing the relation.

Optimizing the relation between NPs in the target set of NPs may comprise applying a linear programming (LP) method, a random sample consensus (RANSAC) method, or a Monte Carlo method.

For example, linear programming may be implemented by defining the relation between a given set of NPs in the target set of NPs as a linear objective function. The given set of NPs may be variables in the linear objective function that can each take a value corresponding to an NP in the target set of NPs. Corresponding area coverages for the given set of NPs may also be variables in the linear objective function. The linear objective function may be subject to the constraints described above. LP techniques may involve finding values of the variables of the linear objective function that optimize, e.g. increase or decrease, an output value of the linear objective function within the constraints. A feasible region or solution space, e.g. a superset of all sets of values of the variables that satisfy the constraints, may be defined by the constraints that the linear objective function is subject to. The solution space of an LP technique may be a convex polytope defined by convex constraints, and the LP technique may involve metric minimization subject to said convex constraints.

In some examples, the solution space defined by the constraints, e.g. a convex hull (defined by the inequality constraints) intersected with hyperplanes (defined by the equality constraints), may be sampled or traversed, e.g. using convex hull computation such as GHULL, while evaluating the objective function to optimize the relation analytically. In some examples, gradient descent approaches may be used in combination with the above techniques to further optimize the relation.

RANSAC or Monte Carlo techniques may additionally or alternatively be implemented to take (pseudo-)random samples of variable values, e.g. which are generated. Each potential set of variable values may be compared to the constraints described above, and the objective function may be evaluated.

Figure 4:
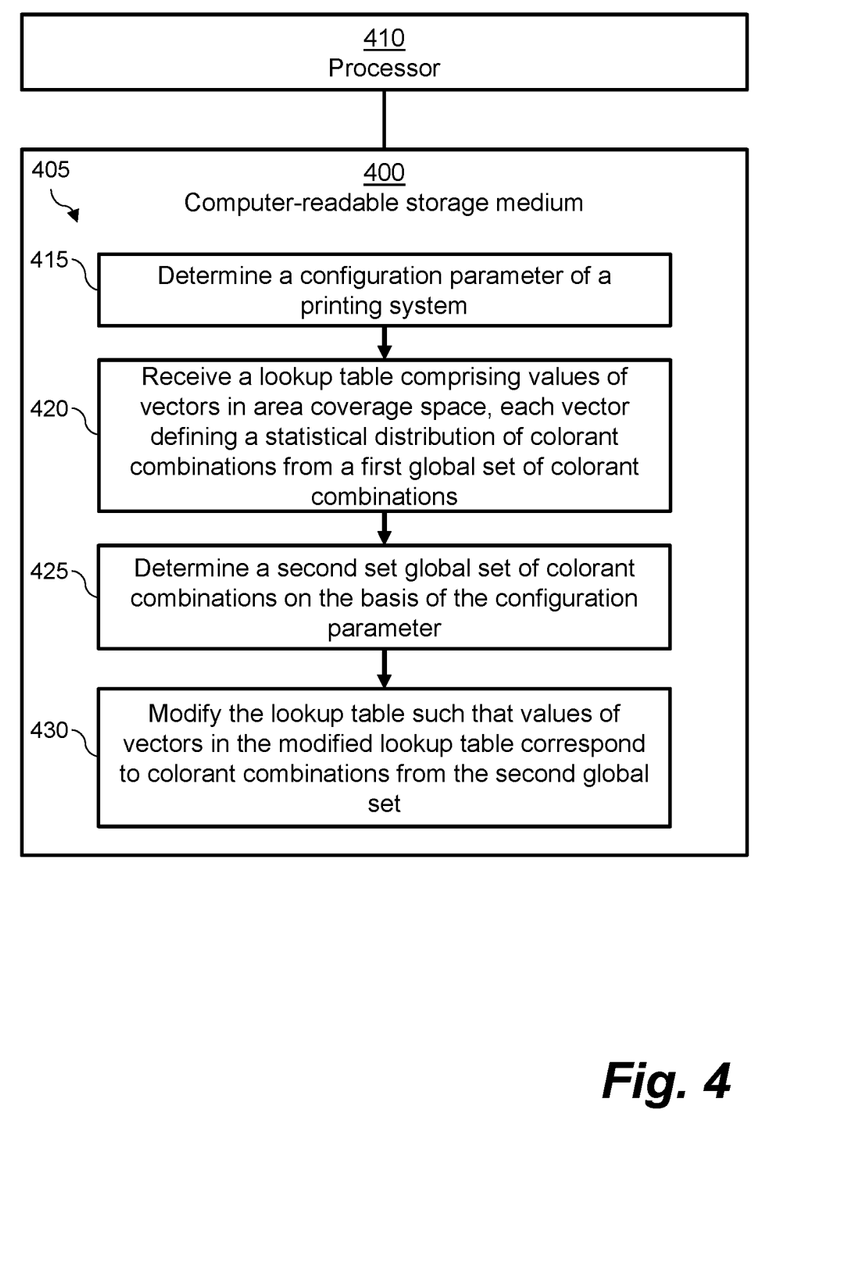
FIG. 4 is a schematic diagram of a processor and a computer readable storage medium with instructions stored thereon according to an example.

FIG. 4 shows a non-transitory computer-readable storage medium 400 comprising a set of computer-readable instructions 405. The computer-readable storage medium 400 is connectably coupled to a processor 410 of a printing system. The printing system may comprise a printing system similar to printing system 100. The set of computer-readable instructions 405 may be executed by the processor 410.

Instruction 415 instructs the processor 410 to determine a configuration parameter of the printing system.

Instruction 420 instructs the processor 410 to receive a lookup table comprising values of vectors in area coverage space, e.g. NPac vector values. Each of the vectors defines a statistical distribution of colorant combinations from a first global set of colorant combinations over an area of a halftone. The color lookup table may be stored in memory within the printing system, for example. Alternatively, the color lookup table may be stored in memory external to the printing system. In examples, the vectors may correspond respectively to entries in the color lookup table. For example, the color lookup table may be a HANS lookup table that maps from a first color space to area coverage space, wherein the vectors comprise a plurality of NPac vectors that are defined with respect to area coverage space.

The first global set of colorant combinations comprises at least one colorant combination that is not available for use by the printing system having the determined configuration parameter.

Instruction 425 instructs the processor 410 to determine a second global set of colorant combinations on the basis of the determined configuration parameter. The second global set of colorant combinations are available for use by the printing system having the determined configuration parameter.

Instruction 430 instructs the processor 410 to modify the lookup table such that values of vectors in the lookup table correspond to colorant combinations from the second global set. In examples, the processor 410 generates vectors that use colorant combinations from the second global set. The processor 410 may then replace the initial vectors in the lookup table with the generated vectors. For example, a given initial vector may be replaced by a given generated vector, where the given initial vector and the given generated vector correspond to the same node in the color lookup table. The node in the color lookup table may be used to map a given coordinate, e.g. in color space. Therefore, when the color lookup table (e.g. HANS lookup table) is used to map the given coordinate, e.g. by the processor 410 during a printing operation, the given coordinate may map to the given generated vector instead of given initial vector. In certain cases, all initial NPac vectors in the color lookup table, e.g. corresponding to entries in a HANS lookup table mapping from a first color space to area coverage space, are updated with respective NPac vectors that are generated according to examples described herein.

Processor 410 can include a microprocessor, microcontroller, processor module or subsystem, programmable integrated circuit, programmable gate array, or another control or computing device. The computer-readable storage medium 400 can be implemented as one or multiple computer-readable storage media. The computer-readable storage medium 400 includes different forms of memory including semiconductor memory devices such as dynamic or static random access memory modules (DRAMs or SRAMs), erasable and programmable read-only memory modules (EPROMs), electrically erasable and programmable read-only memory modules (EEPROMs) and flash memory; magnetic disks such as fixed, floppy and removable disks; other magnetic media including tape; optical media such as compact disks (CDs) or digital video disks (DVDs); or other types of storage devices. The computer-readable instructions 405 can be stored on one computer-readable storage medium, or alternatively, can be stored on multiple computer-readable storage media. The computer-readable storage medium 400 or media can be located either in a printing system or located at a remote site from which computer-readable instructions can be downloaded over a network for execution by the processor 410.

Certain examples described herein enable a HANS lookup table using a first global set of NPs to be converted or modified such that the lookup table uses a second, different global set of NPs. The first and second global sets of NPs may be implementable with different operating states of the printing system. The first global set may not be implementable with a given operating state, whereas the second global set may be implementable with the given operating state. As such, the lookup table may be adapted to account for the printing system being in the given operating state. For example, the printing system may change from an initial operating state to the given operating state. The printing system in the initial operating state may not be able to use the un-converted lookup table having the first global set of NPs. Converting a lookup table according to the examples described herein in therefore allows the lookup table to be adapted to different operating conditions of the printing system, thereby increasing the usability of the color lookup table.

Certain examples described herein enable an efficiency of processing a color lookup table for a printing system to be increased. Converting an existing lookup table that uses an initial global set of NPs to use a new global set of NPs may be more computationally efficient than re-building the lookup table from scratch, or generating a new lookup table, according to the new constraints.

Certain examples described herein enable resources of a printing pipeline to be automatically adjusted in response to changes in the printing conditions, or in order to utilize the hardware running the pipeline in a more efficient manner.

Certain examples described herein enable a usability of a printing system to be increased. The printing system may be in an operating state wherein a given color lookup table is not implementable and/or may yield unexpected or undesired results. For example, a printed output may deviate from an expected output due to the printing system not being able to implement the color lookup table in a pre-defined manner. Adjusting the color lookup table based on the operating state of the printing system allows the printing system to implement the adjusted color lookup table such that deviations between printed outputs and expected outputs may be reduced. As such, a visual quality of a printed output may be increased by using the example methods described herein.

Certain examples described herein enable a reduction in the number of NP components in an NPac vector having the same determinable colorant-use vector. Consolidating the NPs in this way may allow fewer NPs to each cover larger areas, which may increase a visual quality of half-toning in the print output.

In certain cases, updating NPac vectors corresponding to entries in a color lookup table with NPac vectors generated according to examples described herein may increase smoothness of the print output. For example, if an NPac vector is updated to increase area coverage contributions of multi-colorant NPs, i.e. that overprint, contrast between different NPs may be lowered. Therefore, the overall printed image, e.g. halftone pattern, may be smoother. In some cases, criteria of both increasing overprinting and decreasing whitespace, e.g. maximizing overprinting and minimizing whitespace, may decrease grain in color separations. Grain may be associated with local contrast between units, e.g. drops, of colorant combinations, and how such local contrast is distributed (e.g. based on a standard deviation of color or lightness differences). Generating an NPac vector based on this combination of imaging metrics may result in the NPac vector comprising NPs that have a lower contrast between each other compared to the NPs of the original NPac vector. This may therefore contribute to a lower grain in the print output.

In other cases, updating NPac vectors corresponding to entries in a color lookup table with NPac vectors generated according to examples described herein may increase line definition in a print output. For example, if an NPac vector is updated to increase area coverage contributions of single-colorant NPs, i.e. that print side-by-side, more of the print target, e.g. print media, may be occupied using the same amount of print material for a given colorant.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
   determining an operating state of a printing system;
   obtaining a first Neugebauer Primary area coverage (NPac) vector having an initial set of Neugebauer Primaries (NPs), the initial set of NPs comprising a NP that is not implementable with the operating state;
   determining a target set of NPs on the basis of the operating state, the target set of NPs being different from the initial set of NPs and implementable with the operating state;
   generating a second NPac vector using the target set of NPs and replacing the first NPac vector with the second NPac vector for printing;
   wherein the operating state relates to a colorant drop sequence, the colorant drop sequence defining a set of drop states of colorants used by the printing system;
   wherein the NP that is not implementable with the operating state uses a different colorant drop sequence than the colorant drop sequence of the operating state of the printing system;
   wherein determining the target set of NPs comprises:
   obtaining an intermediate set of NPs, the intermediate set of NPs being implementable with the colorant drop sequence; and
   replacing a first NP in the intermediate set of NPs with a second NP on the basis of the initial set of NPs, the first NP and the second NP using different drop states in the colorant drop sequence.

2. The method of claim 1, wherein the initial set of NPs and the target set of NPs comprise different numbers of NPs.

3. The method of claim 1, wherein the operating state comprises a total number of NPs that the printing system is configured to handle.

4. The method of claim 1, wherein the initial set of NPs are implementable with an initial operating state of the printing system, the method comprising detecting a change from the initial operating state to the operating state.

5. The method of claim 1, wherein generating the second NPac vector having the target set of NPs is based on a criterion of a print output of the printing system.

6. The method of claim 1, comprising:
   determining a colorant-use vector of the first NPac vector, the first NPac vector using the initial set of NPs; and
   generating the second NPac vector on the basis of the colorant-use vector of the first NPac vector, the second NPac vector using the target set of NPs.

7. The method of claim 6, wherein the colorant-use vector of the first NPac vector is equal to a colorant-use vector of the second NPac vector.

8. The method of claim 1, comprising:
   obtaining a lookup table comprising NPac vectors having the initial set of NPs;
   determining, for each NP in the initial set of NPs, an area coverage metric defined by the NPac vectors in the obtained lookup table, the area coverage metric for a given NP in the initial set of NPs indicating an extent to which the given NP is used in the obtained lookup table; and
   determining the target set of NPs based on the area coverage metrics for the initial set of NPs.

9. The method of claim 1, wherein:
   the operating state of the printing system comprises the colorant drop sequence in which a specific number of drops may be applied at a location; and
   the NP that is not implementable with the operating state specifies the different colorant drop sequence than is used in the operating state of the printing system.

10. The method of claim 1, wherein the operating state of the printing system comprises a number of passes over a specific location for depositing colorant drops, the NP that is not implementable with the operating state being incompatible with the number of passes implemented in the operating state of the printing system.

11. A printing system comprising:
    a printing device to apply a print material to a print target in a printing process;
    a memory storing a color lookup table to map between color spaces, the color lookup table comprising an initial vector in area coverage space, the initial vector defining a statistical distribution of a first set of colorant combinations over an area of a halftone, the initial vector using at least one colorant combination that is not implementable with an operating state of the printing process; and
    a print controller to:
    determine a parameter of the operating state;
    derive, using the parameter, a second, different set of colorant combinations that are implementable with the operating state; and
    update the initial vector with a different vector in the color lookup table, the different vector using colorant combinations from the second set, wherein colorant use of the different vector is equal to colorant use of the initial vector.

12. The printing system of claim 11, wherein the number of colorant combinations in the second set of colorant combinations is constrained by the operating state.

13. The printing system of claim 11, wherein the deriving the second set of colorant combinations is based at least in part on the first set of colorant combinations.

14. The printing system of claim 11, wherein the operating state relates to a colorant drop sequence of the printing process.

15. The printing system of claim 11, wherein the print controller is to derive the second set of colorant combinations by:
  determining, for each colorant combination in the first set, a value of a lookup table use parameter representing an extent to which the colorant combination is used in the lookup table; and
  deriving the second set of colorant combinations based on the values of the lookup table use parameters for the first set of colorant combinations.

16. The printing system of claim 11, wherein the parameter comprises a number of passes of a printhead over a location at which drops of colorant are applied and a specific number of drops of colorant that the printing system may apply at the location.

17. The printing system of claim 11, wherein deriving the second set of colorant combinations comprises analyzing a color lookup table to determine an extent to which colorant combinations in the first set of colorant combinations are used in the color lookup table.

18. A non-transitory computer-readable storage medium comprising a set of computer-readable instructions that, when executed by a processor of a printing system, cause the processor to:

determine a configuration parameter of the printing system;

receive a lookup table comprising values of vectors in area coverage space, each of the vectors defining a statistical distribution of colorant combinations from a first global set of colorant combinations over an area of a halftone, the first global set of colorant combinations comprising a colorant combination that is not available for use by the printing system having the determined configuration parameter;

determine a second global set of colorant combinations on the basis of the determined configuration parameter, the second global set of colorant combinations being different from the first global set of colorant combinations and available for use by the printing system having the determined configuration parameter; and modify the lookup table such that values of vectors in the modified lookup table correspond to colorant combinations from the second global set;

wherein the configuration parameter comprises a number of passes of a printhead over a location at which drops of colorant are applied and a specific number of drops of colorant that the printing system may apply at the location.

* * * * *